Patented Mar. 4, 1924.

1,485,823

UNITED STATES PATENT OFFICE.

JAMES J. BARRY, OF WOODHAVEN, NEW YORK.

MEANS AND METHOD OF PRESERVING FISH.

No Drawing.     Application filed April 21, 1923.   Serial No. 633,784.

*To all whom it may concern:*

Be it known that I, JAMES J. BARRY, a citizen of the United States, residing at Woodhaven, in the county of Queens and State of New York, have invented certain new and useful Improvements in Means and Methods of Preserving Fish; and I do hereby declare the following to be a full, clear, and exact description of the invention, such as will enable others skilled in the art to which it appertains to make and use the same.

This invention relates to preserved fish and means and method of preserving the same, and has been applied more particularly to preservation of haddock and finnan haddie.

The objects of the invention are to provide an improved product; to enhance the palatability of the product; to impregnate a natural dry tasting fish with moistening substances; to cause the moistening substances to become thoroughly imbedded in the pores of the fish; to provide an after-treatment effecting both the fish and the moistening substance; to employ a moistening substance which will be effective for a considerable time without requiring the fish to be canned or otherwise kept sealed under cover; to employ a moistening substance which will also act as a preservative and enable the fish to be kept in the open for a longer period than otherwise; to retain in the fish the fresh taste distinctive of fresh fish; to secure simplicity in carrying on the method and effectiveness of results, and to obtain other advantages and results as may be brought out in the following description.

In carrying out my invention the fish are treated as soon as possible after being caught and delivered to the curing house. They are then treated with the initial operations usual in preparing cured fish, that is, are split down the belly to the vent and eviscerated, beheaded and washed thoroughly, the sound and all the black membranes lining the abdominal cavity are removed. Following this operation the fish are split down to the tail along the right side of the backbone so they will lie out flat. In this state the rough edges of the backbone are removed, and the fish is then ready for treatment.

In the process of treating the fish in which the present invention inheres more particularly, the fish are immersed in a brine for a suitable length of time, preferably after having been prepared as above outlined. The strength of this brine and the length of time during which the fish are immersed may be varied according to the kind of fish being treated and the conditions to be met. I have found that a 70% brine answers the purpose very well and that an immersion of approximately 50 minutes will be sufficient, but I do not wish to be understood as restricting myself to this particular strength of brine nor this particular time of immersion.

After the immersion of the fish has been completed for a sufficient length of time the fish is then removed and allowed to drain until the excess of brine passes off. Here again, the time may be varied, obviously not being the same for every fish, the length of time required necessarily varying for fish having different characters of meat and for fish of different size and for fish immersed for greater or shorter periods. I have found that about a half an hour is sufficient time to allow the fish to drain after removal from the brine.

Following the draining of the fish, the next step is to immerse the fish in a moistening substance in order to impregnate the meat with said substance. The actual substance used may be one of many combinations, in which I have found olive oil, cotton seed or vegetable oil and fish oil to be very effective. Here again, the length of time necessary for the fish to remain in the moistening substance varies considerably according to the character of the fish. Obviously those fish which have an open porous meat, the moistening substance will thoroughly impregnate the same much more rapidly than in those fish which have a close set meat. Also the time required will vary according to the size of the fish and consistency or viscosity of the moistening substance. The required time would appear to be, according to experiments heretofore made, between 3 and 5 hours. When the fish is thoroughly impregnated with the moistening substance it is removed therefrom and again permitted to drain until the excess of such substance has passed off, after which the fish is placed in a smoke house and the action of the smoke permitted to thoroughly impregnate the fish and take effect upon both the meat of the fish and moistening substance. The smoking of the fish is carried on similar to processes now employed for smoked fish, the fish being suspended on a stick with a space between adjacent fish so as to allow the smoke to circulate and enter the pores of the fish from all sides. The smoke may be produced in any suitable manner such as by a smoldering fire of sawdust. When the smoking is completed the fish may be removed and cooled, and if so desired may be wrapped or otherwise disposed of for marketing.

I wish to point out that by impregnating the fish that the moistening substance, and particularly olive oil, vegetable oil or fish oil that the fish will be preserved for a much longer time than in the case of fish that are not thus impregnated. Furthermore the food value of the fish is greatly increased and the flavor and appearance of the fish is materially enhanced. It may be appropriate to add at this point that the invention is carried out at present in connection with haddock and finnan haddie, but I do not restrict the utilization of the invention to just those kind of fish as it may be found equally desirable in connection with other kinds of fish.

Obviously detail modifications and changes may be made in carrying out my improved processes and in the product obtained therefrom, and I do not wish to be understood as limiting myself except as required by the following claims when construed in the light of the prior art.

Having thus described my invention, I claim:

1. A method of treating fish consisting of immersing the fish in brine, draining, subsequently immersing in oil, draining the fish after the oil has impregnated the same, and smoking the fish after it has drained, whereby the fish and oil remaining therein are simultaneously treated by the smoke.

2. A method of treating fish consisting of immersing the fish in oil, draining the fish after the oil has impregnated the same, and smoking the fish after it has drained, whereby the fish and oil remaining therein are simultaneously treated by the smoke.

In testimony whereof I affix my signature.

JAMES J. BARRY.